(12) United States Patent
Hirth

(10) Patent No.: US 12,467,397 B2
(45) Date of Patent: Nov. 11, 2025

(54) EXHAUST GAS AFTERTREATMENT DEVICE HAVING SMALL CAVITIES

(71) Applicant: Vitesco Technologies GmbH, Regensburg (DE)

(72) Inventor: Peter Hirth, Rösrath (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/571,003

(22) PCT Filed: Jun. 21, 2022

(86) PCT No.: PCT/EP2022/066858
§ 371 (c)(1),
(2) Date: Dec. 15, 2023

(87) PCT Pub. No.: WO2022/268799
PCT Pub. Date: Dec. 29, 2022

(65) Prior Publication Data
US 2025/0129734 A1 Apr. 24, 2025

(30) Foreign Application Priority Data

Jun. 23, 2021 (DE) .............. 10 2021 206 480.9
Dec. 3, 2021 (DE) .............. 10 2021 213 769.5

(51) Int. Cl.
*F01N 3/28* (2006.01)
(52) U.S. Cl.
CPC ............. *F01N 3/2803* (2013.01); *F01N 3/28* (2013.01)

(58) Field of Classification Search
CPC ........ F01N 3/28; F01N 3/2803; F01N 3/2828; F01N 3/2858; F01N 2330/06; F01N 2240/16; F01N 2450/02
(Continued)

(56) References Cited

U.S. PATENT DOCUMENTS

| | | | |
|---|---|---|---|
| 4,160,010 A | 7/1979 | Ottle | |
| 2003/0180198 A1* | 9/2003 | Bruck | ................ F01N 13/1888 422/177 |
| 2006/0233680 A1* | 10/2006 | Muller | ................ F01N 3/0222 422/177 |

FOREIGN PATENT DOCUMENTS

| | | |
|---|---|---|
| DE | 10043654 | 6/2002 |
| EP | 0174919 | 3/1986 |

(Continued)

*Primary Examiner* — Mark A Laurenzi
*Assistant Examiner* — Kelsey L Stanek
(74) *Attorney, Agent, or Firm* — COZEN O'CONNOR

(57) ABSTRACT

A device for aftertreatment of exhaust gases from an engine, with a honeycomb body through which a flow passes along a main flow direction, a ceramic mat, and a first casing that receives the honeycomb body. The ceramic mat is arranged between the honeycomb body and the casing and surrounds the honeycomb body as a ring in peripheral direction. The ceramic mat is configured such that the cavity formed between the honeycomb body and the first casing is filled by the ceramic mat. A method for manufacturing the device, wherein the honeycomb body is received in a second casing and the honeycomb body received in the second casing is surrounded by the ceramic mat as a ring in the peripheral direction. The second casing has, at the end region facing the gas inlet side, a portion having a structure different than the remaining structure of the second casing.

16 Claims, 2 Drawing Sheets

(58) Field of Classification Search
USPC .............................................. 60/299; 422/179
See application file for complete search history.

(56) References Cited

FOREIGN PATENT DOCUMENTS

| | | | |
|---|---|---|---|
| EP | 0336115 | 10/1989 | |
| EP | 765993 A1 * | 4/1997 | .............. B01J 35/04 |
| JP | S6258009 | 3/1987 | |

* cited by examiner

EXHAUST GAS AFTERTREATMENT DEVICE HAVING SMALL CAVITIES

CROSS REFERENCE TO RELATED APPLICATIONS

This is a U.S. national stage of Application No. PCT/EP2022/066858 filed Jun. 21, 2022. Priority is claimed on German Application No. DE 10 2021 206 480.9 filed Jun. 23, 2021 and German Application No. DE 10 2021 213 769.5 filed Dec. 3, 2021, the content of which is incorporated herein by reference.

BACKGROUND OF THE INVENTION

1. Field of the Invention

The disclosure concerns a device for aftertreatment of exhaust gases from an internal combustion engine, with a honeycomb body through which a flow can pass along a main flow direction, a ceramic mat and with at least one first casing which receives the honeycomb body, wherein the ceramic mat is arranged between the honeycomb body and the casing and surrounds the honeycomb body as a ring in the peripheral direction. The disclosure also concerns a method for production of a device, wherein the honeycomb body (2) is received in a second casing (3), and the honeycomb body (2) received in the second casing (3) is surrounded by the ceramic mat (4) as a ring in the peripheral direction.

2. Description of the Related Art

Honeycomb bodies for catalytic converters for exhaust gas aftertreatment of internal combustion engines have a plurality of flow channels through which fluid can flow in a main through-flow direction. Honeycomb bodies, in particular honeycomb bodies made of metal, are formed from a multiplicity of smooth and/or at least partially structured metal sheets which are stacked on top of one another and wound up to form the definitive honeycomb body. For stabilization, and in order to protect against mechanical interference, the matrix formed of metal sheets is inserted in a housing and permanently connected thereto.

In the simplest case, the housing is formed by a tube which is configured to receive the matrix in its interior. A further function of the housing is to ensure the through-flow through the honeycomb body, and in particular prevent exhaust gas from bypassing the honeycomb body.

The matrix must firstly be permanently fastened in the housing, and at the same time the housing must be as light as possible and hence constructed with thin walls. Some embodiments of catalytic converters have an inner casing which directly receives the matrix. The inner casing is then supported against the housing or outer casing by suitable supports.

The disadvantage with devices from the prior art is in particular that air gaps can form between the individual elements of a catalytic converter, for example between the inner casing and the outer casing, and when the matrix is coated with a catalytically active material, these gaps can be filled by this material. Mechanical vibrations and thermal influences during operation can cause this material deposited in the air gaps to detach, which may lead to damage and/or catalytic deactivation of downstream components for exhaust gas aftertreatment. Also, a convective flow can arise in the space between the inner and outer casing insofar as this is accessible for the flowing exhaust gas; this substantially improves the heat transfer between the inner casing and outer casing and thereby significantly reduces the actually desired thermal insulation effect, whereby the catalyst loses temperature and effectiveness.

SUMMARY OF THE INVENTION

It is therefore the object of one aspect of the present invention to provide a device for exhaust gas aftertreatment which allows secure holding of the matrix inside a housing and at the same time reduces or completely avoids the formation of air gaps between the individual components, in order to prevent an undesired detachment of coating material. Moreover, one aspect of the invention relates to a method for producing a device according to the invention.

One aspect of the invention concerns a device for the aftertreatment of exhaust gases from an internal combustion engine, with a honeycomb body through which a flow can pass along a main flow direction, with a ceramic mat and with at least one first casing which receives the honeycomb body, wherein the ceramic mat is arranged between the honeycomb body and the casing and surrounds the honeycomb body as a ring in the peripheral direction, wherein the ceramic mat is configured such that the cavity formed between the honeycomb body and the first casing is completely filled by the ceramic mat, wherein the honeycomb body is received in a second casing and the honeycomb body received in the second casing is surrounded by the ceramic mat as a ring in the peripheral direction, wherein the second casing has, at the end region facing the gas inlet side, a portion having a structure which is different from the remaining structure of the second casing.

The mat serves for fixing the honeycomb body in the first casing, which typically constitutes the outer casing of the device. The ceramic mat is designed to have a thermally insulating property and hence significantly reduces the heat dissipation towards the outer casing. The mat is arranged completely surrounding the honeycomb body in the peripheral direction in order to ensure that no air gaps form between the honeycomb body and the outer casing. The ceramic mat is able to absorb mechanical stresses and in some cases partly dissipate these by compression. These mechanical stresses may arise in particular from the expansion of the matrix of the honeycomb body under the effect of heat.

The ceramic mat preferably has a thickness of 2 mm to 5 mm and, as well as said high thermal insulation, also has electrically insulating properties, which is particularly advantageous if the honeycomb body is electrically heated or stands in conductive contact with an electrically heated honeycomb body.

This is particularly advantageous since production can be improved by a second casing.

The second casing, which is preferably an inner casing and arranged between the honeycomb body and the ceramic mat, may be loaded with a radial force component and thus widened in targeted fashion to a predefined internal cross-section. This process is also known as calibration of the inner casing. In this way, a specific prestress can be generated between the inner casing and the ceramic mat, and at the same time an internal cross-section of the inner casing can be produced which is favorable for receiving the honeycomb body.

The portion on the gas inlet side is formed in particular by an annular region that extends from the gas inlet side along the axial extent of the honeycomb body. The portion may differ from the remaining second casing, e.g. by the choice, thickness or porosity of the material. In particular, structures may be introduced into the portion which cause a change in thermal capacity.

It is particularly advantageous if the second casing has openings in the portion which are arranged spaced apart from one another on the gas inlet side. The openings may for example be formed by rectangular windows which are arranged spaced apart from one another. Alternatively, round or oval holes may be provided that are arranged in a predefinable pattern. It may for example be provided that the number or size of the holes varies along the axial extent.

It is also suitable if the portion of the second casing on the gas inlet side is made from a material different from that of the remaining second casing, wherein this different material has a significantly reduced thermal capacity. Preferably, an expanded metal may be provided which has openings in each structure. Also, a material may be selected which has a lower thermal capacity.

It is furthermore preferred if the portion of the second casing has a porosity of 50% to 90% in comparison with the porosity of the remaining second casing. Because of the changed porosity, in particular the thermal mass of the second casing is reduced, which promotes the heating of the catalytically active structure of the honeycomb body.

It is also advantageous if the ceramic mat in the portion on the gas inlet side is at least in portions directly exposed to the fluid flowing in the honeycomb body.

Furthermore, it is preferred if the portion of the second casing has an axial extent of 20 mm to 50 mm, viewed from the gas inlet side. An extent over such an axial length has proved advantageous in particular in devices for exhaust gas aftertreatment of cars.

It is also advantageous if the second casing is substantially thinner than the first casing, wherein preferably the first casing is 4 to 20 times thicker than the second casing. This is advantageous since the thermal mass is thus reduced to a minimum.

Preferably, the first casing which forms the outer casing of the device has a thickness of 2 mm to 5 mm. This is necessary in order firstly to close the device gas tightly, and secondly to achieve an adequate mechanical stability. The second casing, which constitutes the inner casing between the honeycomb body and the ceramic mat, preferably has a thickness of 0.1 mm to 0.55 mm. The inner casing should be particularly light and be able to be widened or calibrated with a comparatively low force, so that a suitable cross-section can be formed for receiving the honeycomb body.

A preferred exemplary aspect is characterized in that the first casing has a portion which bulges outwardly in the radial direction. Such a bulging region is advantageous since, viewed from the inside, it forms a radially outwardly shaped pocket running around in the circumferential direction, in which in particular the ceramic mat can be received for large parts of its radial extent or even completely. By limiting this bulge in the axial direction, an additional fixing of the ceramic mat and hence of the honeycomb body can also be achieved.

It is also preferred if the region bulging outwardly in the radial direction receives the ceramic mat. This is particularly advantageous for creating both a radial fixing of the ceramic mat and also an axial fixing in the first casing or outer casing.

An exemplary aspect of the invention concerns a method for producing a device according to the invention, wherein the honeycomb body is inserted in a ceramic mat, wherein the ceramic mat with the received honeycomb body is inserted in the first casing, wherein at least a radially acting force is exerted on the first casing, the ceramic mat and/or the honeycomb body.

By exerting a force acting in the radial direction, individual components can be either widened or compressed. In any case, this ensures that the contact between mutually adjacent components is strengthened.

The application of the radially acting force may be used for so-called calibration. Here, at least one of the components is widened or compressed to a defined extent. Thus for example, differences in cross-section of the individual components can be compensated and a tightly fitting seat of the components on one another can be achieved.

In addition, it is advantageous if the device has a second casing, wherein the second casing has an outer diameter which is smaller than or equal to the inner diameter of the ceramic mat, wherein the second casing is radially widened after insertion in the ceramic mat, whereby the ceramic mat is compressed in the radial direction and/or a force acting in the radial direction is exerted by the ceramic mat on the first casing.

In a first arrangement, a ceramic mat is laid in the first casing which forms the outer casing. The second casing or inner casing is then laid in the ceramic mat. The inner casing has a smaller outer diameter than the inner diameter of the ceramic mat. Then from the inside, a radially outwardly directed force is applied to the inner casing, whereby the inner casing is widened to a predefined size. Thus a force component also acts on the ceramic mat, compressing this. Depending on design, a force component may also act on the outer casing.

The inner casing widened to size can then receive the honeycomb body, which is then soldered to the inner casing. The widening ensures that a tightly fitting seat occurs between the inner casing, the ceramic mat and the outer casing, and no air gaps are formed between the individual components. Thus no cavities are created which could be undesirably filled with coating material during subsequent coating of the honeycomb body with a catalytically active coating.

In particular therefore, it is preferred that no coating material collects in the cavities outside the honeycomb body, to prevent an undesired detachment of this coating material in later operation. Since the coating material is catalytically active, it is chemically reactive, whereby in particular in the interaction with other coating materials of exhaust gas aftertreatment components arranged downstream in the flow direction, these components may be damaged. This is described as "toxicity", since the capacity of following components for exhaust gas aftertreatment may be greatly reduced.

It is furthermore advantageous if the honeycomb body, after winding, is fixed against fanning out by a plurality of weld points and inserted in a ceramic mat, wherein the ceramic mat has an inner diameter identical to the outer diameter of the fixed honeycomb body, wherein the ceramic mat with the honeycomb body is inserted in a first casing which has a greater inner diameter than the outer diameter of the ceramic mat, wherein after insertion of the ceramic mat, a radial force is exerted from the outside onto the first casing, whereby the diameter of the first casing is reduced.

An alternative procedure provides that the wound honeycomb body is fixed to the matrix for example with weld points. This prevents the matrix from unrolling or fanning out. The honeycomb body is inserted in a ceramic mat which is designed to receive the honeycomb body with precise fit. The package of honeycomb body and ceramic mat is then inserted in the outer casing which has a larger inner diameter than the inserted package. The outer casing may optionally have an outwardly directed bulge or be cylindrical.

Then a radially inwardly directed force is applied to the outer casing and compresses the outer casing, thus leading to the outer casing being pressed onto the ceramic mat.

It is also suitable if the radial force is exerted on the first casing such that the ceramic mat in the first casing is compressed in both the radial direction and also in the axial direction. In particular, this can advantageously be achieved if the outer casing has an outwardly directed bulge in which the ceramic mat and honeycomb body are inserted. In particular, an outer casing with bulging portion also allows easy fixing in the axial direction if the ceramic that comes into contact with the flanks of the outer casing running from the bulging portion to the non-bulging portion.

In addition, it is advantageous if the radial force is exerted on the portion of the first casing which bulges in the radial direction. This is particularly advantageous since the ceramic mat with the honeycomb body is arranged in this portion.

Advantageous developments of the present invention are described in the dependent claims and in the description of the figures that follows.

BRIEF DESCRIPTION OF THE DRAWINGS

The invention will be explained in more detail hereunder by means of exemplary embodiments with reference to the drawings, in which.

DETAILED DESCRIPTION OF THE PRESENTLY PREFERRED EMBODIMENTS

Figure 1:
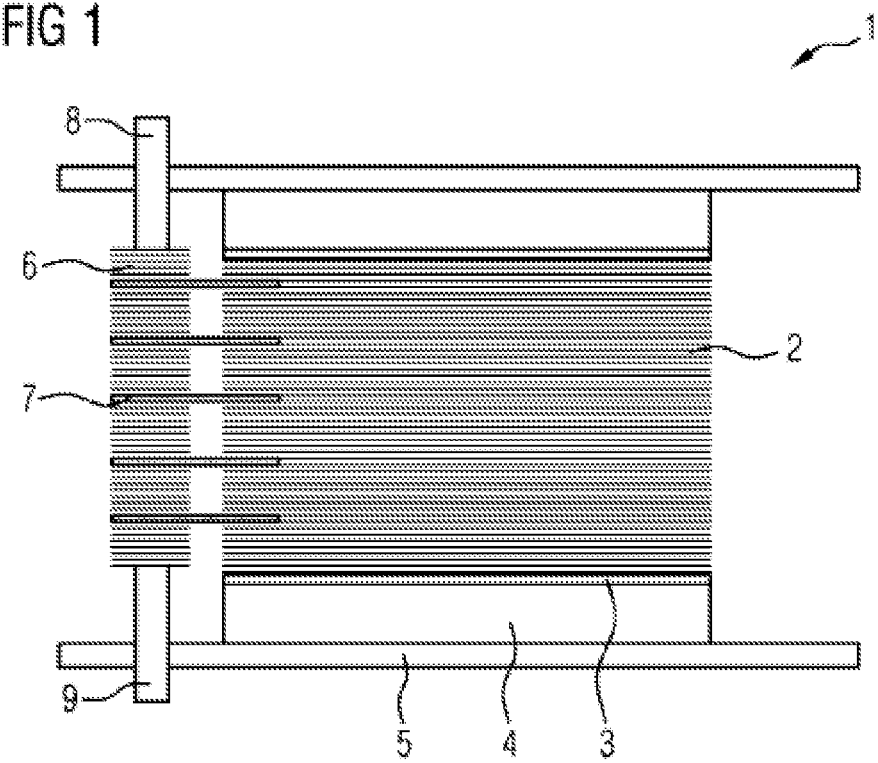
FIG. 1 is a schematic view of a honeycomb body received in an inner casing, and a ceramic mat received in an outer casing.

FIG. 1 shows a device 1 for exhaust gas aftertreatment. The device 1 has a honeycomb body 2 which is received in an inner casing 3. The honeycomb body 2 with the inner casing 3 is received in a ceramic mat 4. The ceramic mat 4 in turn is received in the outer casing 5, which may form the outwardly visible housing.

FIG. 1 shows a sectional view through the centre axis of the honeycomb body 2. The casing 3, the ceramic mat 4 and the outer casing 5 are annular elements which surround the cylindrical honeycomb body. In alternative embodiments, cross-sectional forms may be selected which are not a circular cross-section.

On the left of the honeycomb body 2, a heating disc 6 of an electrically heated honeycomb body is shown, which is connected to the honeycomb body 2 via support pins 7. The heating disc 6 can be electrically contacted via electrical bushings 8, 9. By applying a current to the heating disc 6, this can be heated using ohmic resistance. The heating disc 6 may be arranged upstream or downstream of the honeycomb body 2 in the through-flow direction.

The outer casing 5 in FIG. 1 is tubular and has a cross-section which is constant along the length. Preferably, the inner casing 3 is exposed to a radially outwardly directed force in order to compress the ceramic mat 4 in the radial direction and build up pressure on the outer casing 5. Thus the package of honeycomb body 2, inner casing 3 and ceramic mat 4 can be fixed relative to the outer casing 5. In addition, it is possible that after insertion of the honeycomb body 2, the outer casing 5 is exposed to a radially inwardly directed force in order to compress the entire device and fix the individual components to one another. Alternatively or additionally, individual components or all components may be connected together by substance bonding by means of soldering or a similar process.

Figure 2:
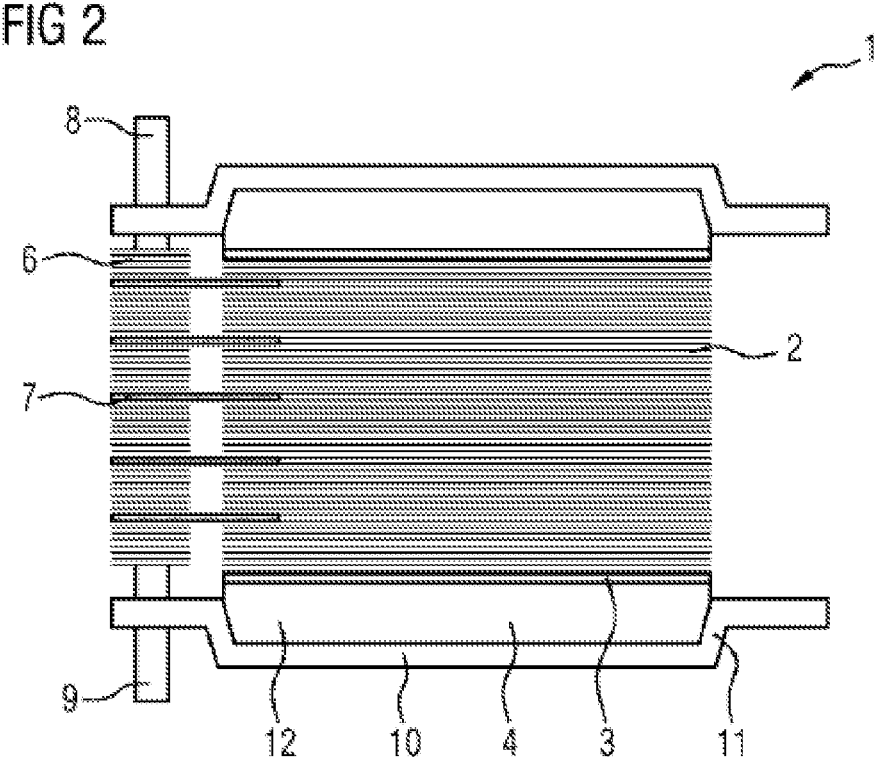
FIG. 2 is a schematic view corresponding to FIG. 1, wherein the outer casing has a radially outwardly bulging portion.

FIG. 2 shows a structure similar to FIG. 1. Identical elements therefore carry the same reference signs. In contrast to FIG. 1, the outer casing 10 is configured such that it has a radially outwardly bulging portion 11. This bulge 11 is preferably formed running completely around in the circumferential direction, and in the inside of the outer casing 10 forms a receiving region 12 for the ceramic mat 4.

The ceramic mat 4 can be fixed in the interior by the application of a radially inwardly directed force onto the outer casing 10. By arranging the ceramic mat 4 inside the receiving region 12 formed by the bulge 11, this is also fixed in the axial direction of the device 1.

Figure 3:
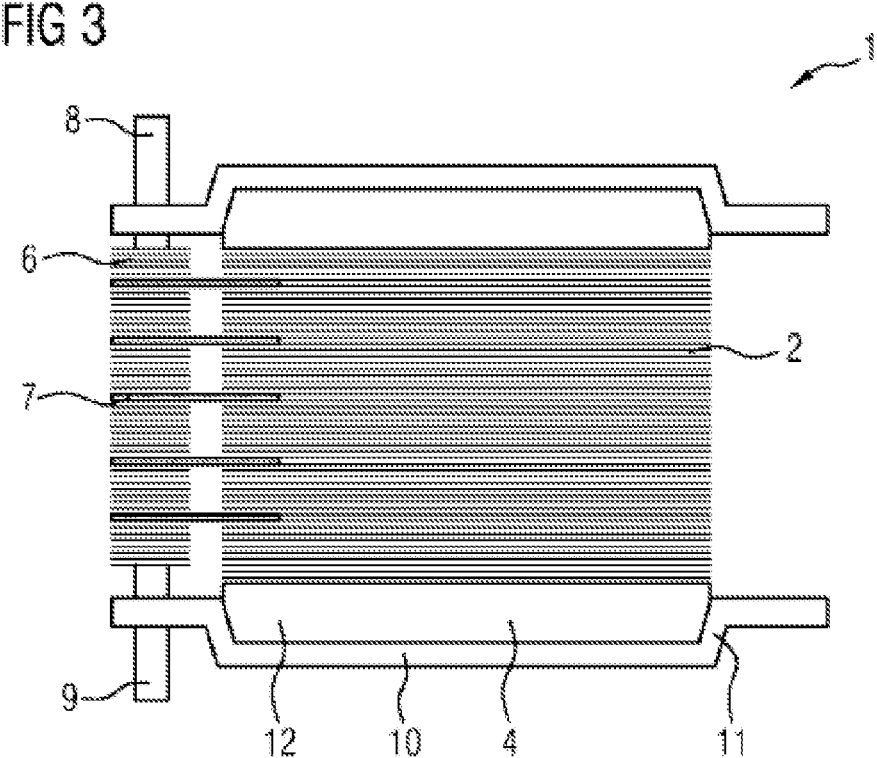
FIG. 3 is a schematic view corresponding to FIG. 2, wherein no inner casing is arranged between the ceramic mat and the honeycomb body.

FIG. 3 shows an alternative embodiment of the device in FIG. 2. In contrast to FIG. 2, there is no inner casing 3 in FIG. 3. In an embodiment according to FIG. 3, the fully wound honeycomb body 2 is fixed against unrolling or fanning out by a plurality of weld points.

The honeycomb body 2 is then inserted in a ceramic mat 4 and inserted in the receiving region 12 of the outer casing 10. The honeycomb body 2 and ceramic mat 4 can be fixed in the outer casing 10 by the application of a radially inwardly directed force.

Because of the application of the radial forces in the devices from FIGS. 1 to 3, a tight fit can be achieved and hence the formation of air gaps between the individual components avoided. The coating of the honeycomb body with a catalytically active surface coating thus no longer leads to deposits of coating material in air gaps.

Figure 4:
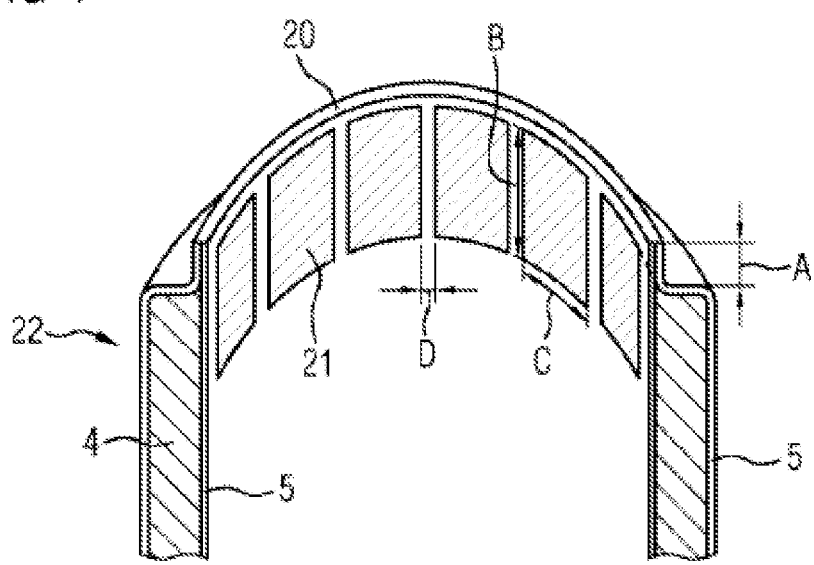
FIG. 4 is a perspective sectional view through a second casing serving as an inner casing, which in a portion of the gas inlet side has a structure differing from the remaining second casing.

FIG. 4 shows an inner casing 3 having a portion 22 which extends from the gas inlet side 20 in the axial direction along the length designated with reference sign B. The inner casing 3 is inserted in an outer casing 5, wherein the outer casing 5 forms a cavity in which a ceramic mat 4 is inserted.

In the exemplary aspect of FIG. 4, the portion 2 has multiple rectangular openings 21. The openings are spaced apart from one another in the peripheral direction and thus drastically reduce the thermal mass of the second casing 3 in the portion 22.

In the exemplary embodiment of FIG. 4, which is exemplary for one aspect of the invention, the rectangular openings 21 have a width C in the circumferential direction which preferably amounts to 30 mm. The axial extent of the openings 21 in this exemplary embodiment is 30 mm. The distance D in the peripheral direction in this exemplary embodiment is 5 mm. The distance A between the edge delimiting the second casing 3 on the gas inlet side 20 and the openings 21 is here preferably 7 mm. In the example shown, there are 10 openings.

Designs deviating from this are possible. The exemplary embodiment of FIG. 4 shows a possible embodiment.

The different features of the individual exemplary embodiments can also be combined with one another. Thus in particular, the outer casing with bulge may be combined with an inner casing.

The exemplary embodiments of FIGS. 1 to 4 in particular have no restrictive character and serve to clarify the inventive concept.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for aftertreatment of exhaust gases from an internal combustion engine, comprising:
    at least one first casing;
    a honeycomb body through which a flow can pass along a main flow direction from a gas inlet side to a gas outlet side;
    a ceramic mat and with at least one first casing that receives the honeycomb body, wherein the ceramic mat is arranged between the honeycomb body and the at least one first casing and surrounds the honeycomb body as a ring in a peripheral direction,
    wherein the ceramic mat is configured such that a cavity formed between the honeycomb body and the at least one first casing is completely filled by the ceramic mat; and
    a second casing in which the honeycomb body is received, and the second casing is surrounded by the ceramic mat as a ring in the peripheral direction,
    wherein the second casing has, at an end region facing a gas inlet side, a portion having a structure which is different from a remainder of structure of the second casing, wherein the portion has a lower thermal capacity than the remainder of the structure.

2. A device as claimed in claim 1 for aftertreatment of exhaust gases from an internal combustion engine, comprising:
    at least one first casing;
    a honeycomb body through which a flow can pass along a main flow direction from a gas inlet side to a gas outlet side;
    a ceramic mat and with at least one first casing that receives the honeycomb body, wherein the ceramic mat is arranged between the honeycomb body and the at least one first casing and surrounds the honeycomb body as a ring in a peripheral direction,
    wherein the ceramic mat is configured such that a cavity formed between the honeycomb body and the at least one first casing is completely filled by the ceramic mat; and
    a second casing in which the honeycomb body is received, and the second casing is surrounded by the ceramic mat as a ring in the peripheral direction,
    wherein the second casing has, at an end region facing a gas inlet side, a portion having a structure which is different from a remainder of structure of the second casing,
    wherein the ceramic mat in the portion on the gas inlet side is at least in portions directly exposed to a fluid flowing in the honeycomb body.

3. The device as claimed in claim 1, wherein the portion of the second casing has an axial extent of 20 mm to 50 mm, viewed from the gas inlet side.

4. The device as claimed in claim 1, wherein the second casing is thinner than the at least one first casing.

5. The device as claimed in claim 4, wherein the first casing is 4 to 20 times thicker than the second casing.

6. The device as claimed in claim 1, wherein the at least one first casing has a portion which bulges outward in a radial direction.

7. The device as claimed in claim 6, wherein the region bulging outward in the radial direction receives the ceramic mat.

8. The device as claimed in claim 1, wherein the portion of the second casing with the lower thermal capacity is one of thinner and more porous than the remainder of the second casing.

9. A device for aftertreatment of exhaust gases from an internal combustion engine, comprising:
    at least one first casing;
    a honeycomb body through which a flow can pass along a main flow direction from a gas inlet side to a gas outlet side;
    a ceramic mat and with at least one first casing that receives the honeycomb body, wherein the ceramic mat is arranged between the honeycomb body and the at least one first casing and surrounds the honeycomb body as a ring in a peripheral direction,
    wherein the ceramic mat is configured such that a cavity formed between the honeycomb body and the at least one first casing is completely filled by the ceramic mat; and
    a second casing in which the honeycomb body is received, and the second casing is surrounded by the ceramic mat as a ring in the peripheral direction,
    wherein the second casing has, at an end region facing a gas inlet side, a portion having a structure which is different from a remainder of structure of the second casing,
    wherein the second casing has openings in the portion which are arranged spaced apart from one another on the gas inlet side.

10. A device for aftertreatment of exhaust gases from an internal combustion engine, comprising:
    at least one first casing;
    a honeycomb body through which a flow can pass along a main flow direction from a gas inlet side to a gas outlet side;
    a ceramic mat and with at least one first casing that receives the honeycomb body, wherein the ceramic mat is arranged between the honeycomb body and the at least one first casing and surrounds the honeycomb body as a ring in a peripheral direction,
    wherein the ceramic mat is configured such that a cavity formed between the honeycomb body and the at least one first casing is completely filled by the ceramic mat; and a second casing in which the honeycomb body is received, and the second casing is surrounded by the ceramic mat as a ring in the peripheral direction, wherein the second casing has, at an end region facing a gas inlet side, a portion having a structure which is different from a remainder of structure of the second casing, wherein the portion of the second casing on the gas inlet side is made from a material different from the remainder of the second casing, wherein the different material has a significantly reduced thermal capacity.

11. The device as claimed in claim 10, wherein the portion of the second casing has a porosity of 50% to 90%, in comparison with a porosity of the remainder of the second casing.

12. A method for producing a device for aftertreatment of exhaust gases, comprising:
providing a second casing having at an end region facing a gas inlet side, a portion having a structure which is different from a remainder of structure of the second casing, wherein the portion has a lower thermal capacity than the remainder of the structure;
inserting a honeycomb body in the second casing;
inserting the honeycomb body and the second casing in a ceramic mat;
inserting the ceramic mat and the second casing with the honeycomb body in a first casing; and
exerting at least a radially acting force on the first casing, the ceramic mat and/or the honeycomb body.

13. The method for producing the device as claimed in claim 12, wherein the second casing has an outer diameter which is smaller than or equal to an inner diameter of the ceramic mat, wherein the second casing is radially widened after insertion in the ceramic mat, whereby the ceramic mat is compressed in a radial direction and/or a force acting in the radial direction is exerted by the ceramic mat on the first casing.

14. The method as claimed in claim 12, wherein the honeycomb body, after winding, is fixed against fanning out by a plurality of weld points and inserted in the ceramic mat, wherein the ceramic mat has an inner diameter identical to an outer diameter of the fixed honeycomb body, wherein the ceramic mat with the honeycomb body is inserted in the first casing which has a greater inner diameter than the outer diameter of the ceramic mat, wherein after insertion of the ceramic mat, a radial force is exerted from outside onto the first casing, whereby the diameter of the first casing is reduced.

15. The method as claimed in claim 14, wherein the radial force is exerted on the first casing such that the ceramic mat in the first casing is compressed in both a radial direction and also in an axial direction.

16. The method as claimed in claim 15, wherein the radial force is exerted on a portion of the first casing which bulges in the radial direction.

* * * * *